G. C. MATHER.
SUPPORT FOR DEMOUNTABLE RIMS.
APPLICATION FILED DEC. 14, 1917.
1,324,461.
Patented Dec. 9, 1919.
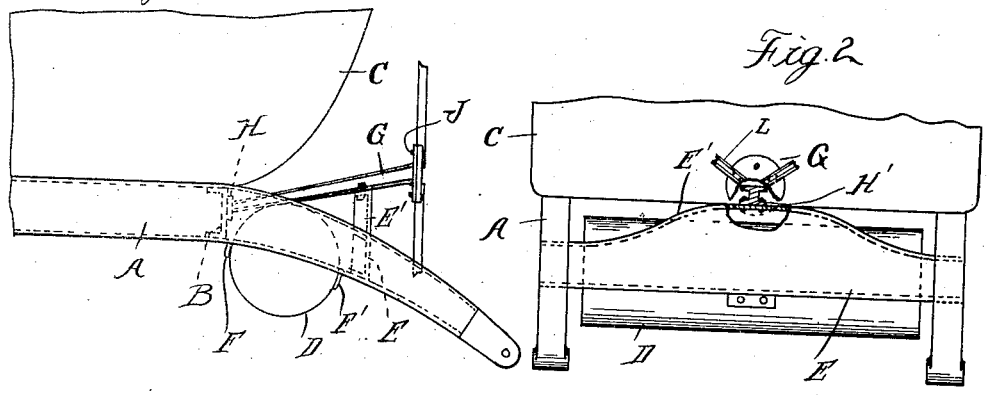
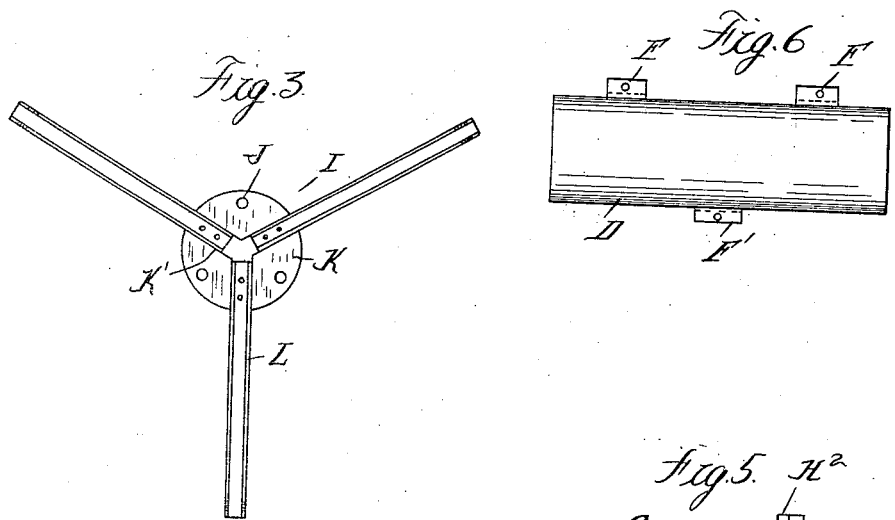
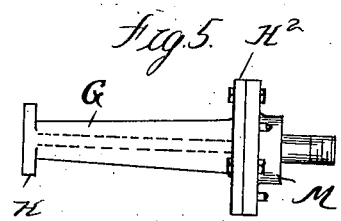
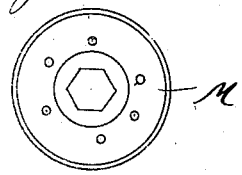
Inventor
Gordon C. Mather
By Whittemore Hulbert & Whittemore
Attorneys

UNITED STATES PATENT OFFICE.

GURDON CLARK MATHER, OF DETROIT, MICHIGAN.

SUPPORT FOR DEMOUNTABLE RIMS.

1,324,481.

Specification of Letters Patent. Patented Dec. 9, 1919.

Application filed December 14, 1917. Serial No. 207,045.

*To all whom it may concern:*

Be it known that I, GURDON C. MATHER, a citizen of the United States of America, residing at Detroit, in the county of Wayne and State of Michigan, have invented certain new and useful Improvements in Supports for Demountable Rims, of which the following is a specification, reference being had therein to the accompanying drawings.

The invention relates to a support for a demountable rim and one of the objects of the invention is to obtain a construction which reinforces the vehicle frame and carries the gasolene tank by a three-point suspension. Another object of the invention is to obtain a simple and substantial construction which may be cheaply manufactured. Still another object of the invention is to obtain a construction of rim support which may be readily adapted to carry a spare wheel. Further objects of the invention reside in the novel arrangement and combination of parts, as more fully hereinafter described.

In the drawings:

Figure 1 is a side elevation of a structure partly shown embodying my invention;

Fig. 2 is a fragmentary rear elevation partly in section thereof;

Fig. 3 is a rear elevation of the demountable rim carrier;

Fig. 4 is a rear elevation of the wire wheel carrier;

Fig. 5 is a plan view of the bar of the support; and

Fig. 6 is a plan view of the gasolene tank with its securing brackets.

A represents the side-bars, B the rear cross-bar and C the body of usual construction in automobiles. D represents the gasolene tank located adjacent to and in rear of the rear cross-bar B and located preferably beneath the upper sides of the side-bars A. The cross-bar E in rear of the tank D and adjacent thereto, extends between the side-bars A and is provided with a centrally upwardly extending portion E', this cross-bar reinforcing the frame of the automobile. The tank D is secured in place by means of two angle-shaped brackets F secured to the cross-bar B and one angle-shaped bracket F' secured to the cross-bar E, the latter bracket located intermediately of the former brackets. By this construction a three-point suspension for the gasolene tank is obtained, thereby eliminating the objectionable strains upon the tank incurred by securing the same in other ways.

For the purpose of supporting the "extra" or "spare" automobile rim, the bar G preferably of I-cross-section and extending longitudinally of the automobile frame is provided, having lugs H at the forward end through which pass suitable securing means, such as bolts, for securing the bar to the rear cross-bar B. Intermediate the ends of the bar G, lugs H' are provided through which pass other suitable securing means, such as bolts, for holding the same upon the centrally upwardly extending portion E' of the cross-bar E.

The rear end of the bar G is enlarged, $H^2$, and mounted upon this enlarged end is the rim carrier I secured thereto by means of the bolts J. The carrier comprises the base K formed of sheet-metal and preferably having the three channel-shaped radially extending grooves K' formed therein, within which are riveted the channel-shaped spokes L, each of the same length sufficient to engage the inner periphery of the automobile rim and provided with suitable means (not shown) for locking the rim in place.

The enlarged end $H^2$ of the bar G is of a size and the bolts J are so spaced that when a spare wheel is to be carried, the rim carrier I is removed and the spare wheel support M is placed upon the enlarged end $H^2$ of the bar G and secured thereto by the bolts J. Thus it is seen that my construction is adapted to alternatively carry automobile rims and spare wheels.

What I claim as my invention is:

1. In a vehicle having a frame of side-bars and a rear cross-bar, the combination with a cross-bar in rear of the rear cross-bar and extending between the side bars of the vehicle frame, of a bar secured to both of said cross-bars, and means upon said bar for engaging and carrying a rim.

2. In a vehicle having a frame of side-bars and a rear cross-bar, the combination with a demountable rim support connected to said rear cross-bar and extending longitudinally of the frame, of a cross-bar extending between said side bars provided with an upwardly-extending portion intermediate its ends, and means for securing said support to said portion.

3. In a demountable rim support the combination with a bar having an enlarged end, of a carrier base formed of sheet-metal and secured to said enlarged end, said base having radially-extending channels formed therein, and channel-shaped spokes fitting within said channels and secured to said base.

4. In a vehicle having a frame, the combination with a bar mounted on said frame, of a carrier base on said bar, formed of sheet-metal and having radially-extending grooves therein, and spokes engaging said grooves and secured to said base.

5. In a vehicle having a frame of side-bars and a rear cross-bar, the combination with a demountable rim support connected to said rear cross-bar and extending longitudinally of the frame, of a cross-bar extending between said side bars provided with a portion intermediate its ends of greater depth, upon which said rim support is mounted.

6. In a demountable rim support, the combination with a bar, of a carrier base secured to one end of said bar, said base having radially-extending grooves therein, and spokes fitting within said grooves and secured to said base.

7. In a vehicle having a frame comprising side bars and cross-bars, a single bracket mounted midway of said side bars upon one of said cross-bars, provided with a portion adapted to interchangeably receive the central portions of a spare wheel support or a rim support.

8. In a vehicle, the combination with the frame having side-bars and cross-bars, of a bar mounted upon one of said cross-bars and between said side-bars, said bar having a portion adapted to interchangeably receive the central portions of a spare wheel support or a rim support.

9. In a vehicle, the combination with the frame having side-bars and cross-bars, of a cross-bar in rear of the rear cross-bar of the frame and extending between the side-bars thereof, a bar extending transversely of said last-mentioned cross-bar and secured thereto, and a rim carrier on said transversely-extending bar.

In testimony whereof I affix my signature.

GURDON CLARK MATHER.